United States Patent Office 3,505,390
Patented Apr. 7, 1970

3,505,390
PROCESS FOR IMPROVING THE THERMAL STABILITY OF DIMETHYL TEREPHTHALATE AND PRODUCT THEREOF
Gerhart Hoffmann, Witten-Rudinghausen, Germany, assignor to Chemische Werke Witten G.m.b.H., Witten (Ruhr), Germany
No Drawing. Filed Mar. 18, 1966, Ser. No. 535,335
Claims priority, application Germany, Mar. 27, 1965, C 35,440
Int. Cl. C07c 67/06, 69/82
U.S. Cl. 260—475                              10 Claims

ABSTRACT OF THE DISCLOSURE

This disclosure relates to thermally stabilizing dimethyl terephthalate by adding a monohydric, saturated aliphatic alcohol of 1 to 4 carbon atoms thereto. The invention is particularly applicable to stabilizing molten DMT, preferably with methanol.

---

This invention relates to thermally stabilized dimethyl terephthalate. More particularly, it relates to thermally stabilized dimethyl terephthalate and a process for improving the thermal stability of dimethyl terephthalate. Even more particularly, the invention relates to improving the thermal stability of dimethyl terephthalate by incorporating an alcohol therein.

Dimethyl terephthalate (DMT) is often used as a starting material for the preparation of polyester fibers and films and, in this use, is needed in the form of a melt therefrom. If the DMT production and polycondensation phases are close together in location, the molten DMT may be pumped from the production plant to the polycondensation processing stage. Where this was impractical because of a greater distance between the production and the polycondensation processing plants, it has been customary heretofore to convert the DMT from the molten into the crystalline state in order to readily transport the same. This has been done, for example, by means of scaling rollers, whereby the DMT is melted down again at the place of actual processing. Such scaling, packing and re-melting of the product involves relatively high costs with respect to packing materials and to the coordination and supervision thereof. Such costs could be obviated if the dimethyl terephthalate were transported in the molten condition, however, in this case, poorer quality products are obtained since the thermal stability of dimethyl terephthalate is not sufficient for a prolonged storage at 160° to 180° C. The thermal instability of DMT becomes apparent primarily in an increase of the acid number and by discoloration thereof.

One of the objects of the present invention is to provide an improved process for enhancing the thermal stability of dimethyl terephthalate.

Another object of the present invention is to provide a thermally stabilized dimethyl terephthalate composition.

A further object of the invention is to provide an efficacious process for improving the thermal stability of dimethyl terephthalate.

A still further object of the invention is to provide an economical process for improving the thermal stability of dimethyl terephthalate and the stabilized product thereof which overcomes the disadvantages and deficiencies of the prior art methods.

These and other objects and advantages of the present invention will become apparent to those skilled in the art from a consideration of the following specification and claims.

In accordance with the present invention, it has been surprisingly found that the thermal instability of dimethyl terephthalate is essentially eliminated if a monohydric, saturated aliphatic alcohol having from one to four carbon atoms or a mixture thereof is added to the melt of DMT. Methanol is the preferred additive. The amount of additive may vary from 0.01 to 3.0% by weight and preferably from 0.1 to 1.0% by weight.

The addition of said alcohol to the melt of DMT may be made by introducing a stream of inert gas such as nitrogen or carbon dioxide which is saturated with the desired alcohol at a temperature of 40–50° C. into the melt. The necessary amount of alcohol is expediently filled into a vessel, heated to 40–50° C. and then the gas is bubbled therethrough. If large amounts of DMT are being stored, it is advisable to add the alcohol by means of a pump which delivers the appropriate dosages thereof.

The alcohol additive dissolves for the most part in the melt of DMT, but will gradually evaporate. Consequently, for prolonged periods of storage the alcohol addition must either be repeated or must be made continuously. As stated hereinabove, methanol is the preferred alcohol additive. Ethanol, n-propanol, isopropanol, n-butanol, isobutanol, sec-butanol and tert-butanol may also be employed, however, although these alcohols show the same effect upon the thermal stability of DMT as methanol, methanol is preferred since it contains the same alkyl moiety as is present in the dimethyl terephthalate.

Although it is not intended to limit the present invention by the veracity of any theoretical explanation, the surprising influence of the abovementioned lower alkyl alcohols on the thermal stability of dimethyl terephthalate may possibly be due to the blocking of catalytically active centers on the container or vessel surface by the alcohol. The prevention of auto-oxidation by the formation of a protective gas layer over the melt must be precluded as an explanation since such a covering with the purest nitrogen or with an addition of lower ketones or esters or of hydrogen chloride does not influence the thermal stability of dimethyl terephthalate.

The present invention makes it possible to store dimethyl terephthalate melts for at least seven days at 160° C. without a noticeable deterioration in the quality thereof. This is of particular significance in cases where the dimethyl terephthalate can not be further processed to the polyester condensate immediately. Particularly, the liquid transport of dimethyl terephthalate over large distances is rendered possible thereby.

The following examples are given merely as illustrative of the present invention and are not to be considered as limiting.

EXAMPLE I

Extremely pure dimethyl terephthalate in the form of flakes as obtained from the production of a large industrial plant is filled into tubules made of Jena glass having a diameter of 2.3 cm. and a height of 20 cm. Thereafter, chemically pure methanol in amounts of from 0.1 to 1% by weight of the dimethyl terephthalate in said tubules is added to the tubules as shown in Table 1. All of the tubules are then melted down. The tubules are thereupon covered with small beakers and heated in a warming cabinet for 48 hours to 200° C. The Hazen's color count of the resultant melt is then determined at twelve hour intervals. Table 1 shows the results thereof.

TABLE 1

| Sample No.: | Hazen's color count of the melt prior to heating | Addition | Hazen's color count of the melt after— | | | |
|---|---|---|---|---|---|---|
| | | | 12 hours | 24 hours | 36 hours | 48 hours |
| 1 | 10 | No addition | 120 | 250 | 350 | Over 500 |
| 2 | 10 | ___do___ | 90 | 150 | 200 | 300 |
| 3 | 10 | 1% methanol | 10 | 10 | 10 | 10 |
| 4 | 10 | ___do___ | 10 | 10 | 10 | 10 |
| 5 | 10 | 0.5% methanol | | 10 | 10 | 10 |
| 6 | 10 | ___do___ | 10 | 10 | 10 | 10 |
| 7 | 10 | 0.2% methanol | 10 | 10 | 10 | 10 |
| 8 | 10 | ___do___ | 10 | 10 | 10 | 10 |
| 9 | 10 | 0.1% methanol | 10 | 10 | 40 | 70 |
| 10 | 10 | ___do___ | 10 | 10 | 20 | 60 |

These experimental results show that a strong discoloration of the product sets in after heating to 200° C. for 48 hours where there has been no addition of methanol thereto (samples 1 and 2). However, when methanol is added to the dimethyl terephthalate in an amount of over 0.2%, it is completely stable under the same conditions samples 3–8). With a methanol addition of only 0.1%, a slight instability of the product is observed (samples 9 and 10). The latter methanol addition thus fails, under these experimental conditions, to achieve a good thermal stability in the DMT.

EXAMPLE II

The purest dimethyl terephthalate having a Hazen's color count of 10, as obtained from the production of a large industrial plant, is heated to 200° C. for 48 hours under the conditions described in Example I. Instead of methanol, 0.5% by weight of anhydrous ethanol is added to the DMT prior to the start of the heating operation. The Hazen's color count of the product is unchanged after the thermal treatment, it remaining at 10.

EXAMPLE III 2.5 tons of pure dimethyl terephthalate, as obtained from the production of a large industrial plant, is pumped into a three cubic meter refined steel (V4A) container and stored therein under inert gas a 160° C. After 155 hours, scaling or flaking is effected over a scaling roller, and a number of average samples are removed from the resultant product. Table 2 shows the results of an analysis taken on these samples with respect to acid number, solidification point and Hazen's color count number.

It can be seen from the results in Table 2 that a considerable increase in the acid number and the Hazen's color count is observed when the dimethyl terephthalate is stored for 155 hours at 160° C.

EXAMPLE IV 2.5 tons of pure dimethyl terephthalate, as obtained from the production of a large industrial plant, is pumped into a there cubic meter refined steel (V4A) container and stored therein along with the addition of 10.75 kg. of methanol at 160° C. The addition of methanol is made by means of a dosing or measuring pump in such a manner that 2.5 kg. of methanol is initially introduced into the container over a period of three hours and, thereafter, 0.05 kg. of methanol is fed in every 165 hours of storage time. At the termination of 168 hours, scaling or flaking is effected over a scaling roller, and a number of average samples are removed from the resultant product. Table 3 shows the results of an analysis on these dimethyl terephthalate products with respect to acid number, solidification point and Hazen's color count.

TABLE 3

| Sample No.: | Taking of sample | Acid number | Solidification point | Hazen's color count of melt |
|---|---|---|---|---|
| 15 | Prior to beginning experiment | 0.00 | 140.63 | 10 |
| 16 | During scaling, 0 to 800 kg | 0.00 | 140.62 | 10 |
| 17 | During scaling, 800 to 1,600 kg | 0.00 | 140.62 | 10 |
| 18 | During scaling, 1,600 to 2,500 kg | 0.00 | 140.61 | 10 |

It is to be noted from Table 3 that no noticeable deterioration of the quality of the dimethyl terephalate product occurs after storage of the product at 160° C. for 168 hours when the addition of 0.1% by weight of methanol is employed.

The invention being thus described, it will be obvious that the same may be varied in many ways. Such variations are not to be regarded as a departure from the spirit and scope of the invention and all such modifications are intended to be included within the scope thereof.

TABLE 2

| Sample No.: | Taking of sample | Acid number | Solidification point | Hazen's color count of melt |
|---|---|---|---|---|
| 11 | Prior to beginning experiment | 0.00 | 140.63 | 10 |
| 12 | During scaling, 0 to 800 kg | 0.05 | 140.61 | 40 |
| 13 | During scaling, 800 to 1,600 kg | 0.05 | 140.61 | 40 |
| 14 | During scaling, 1,600 to 2,500 kg | 0.05 | 140.62 | 30 |

I claim:
1. A process for improving the thermal stability of molten dimethyl terephthalate which comprises adding from about 0.01 to 3% by weight of a monohydric, saturated aliphatic alcohol having from 1 to 4 carbon atoms to said molten dimethyl terephthalate, the alcohol remaining in contact therewith.
2. The process of claim 1 wherein said alcohol is added in an amount of from about 0.1 to 1% by weight.
3. The process of claim 1, wherein said alcohol is methanol.
4. A process for improving the thermal stability of dimethyl terephthalate maintained in a molten state at a temperature up to about 200° C. which comprises adding from about 0.01 to 3% by weight of a monohydric, saturated aliphatic alcohol having from 1 to 4 carbon atoms to said molten dimethyl terephthalate.
5. The process of claim 4 wherein the concentration of said alcohol in contact with said molten dimethyl terephthalate is maintained at about 0.01 to 3% by weight by adding an additional quantity of said alcohol to the alcohol-dimethyl terephthalate mixture substantially as fast as said alcohol evaporates therefrom.
6. The process of claim 5, wherein said alcohol concentration is maintained at from about 0.1 to 1% by weight.
7. The process of claim 6, wherein said alcohol is methanol.
8. A thermally stabilized composition consisting essentially of molten dimethyl terephthalate and from about 0.01 to 3% by weight of a monohydric, saturated aliphatic alcohol having from 1 to 4 carbon atoms.
9. A thermally stabilized composition consisting essentially of molten dimethyl terephthalate and from about 0.1 to 1% by weight of a monohydric, saturated aliphatic alcohol having from 1 to 4 carbon atoms.
10. A thermally stabilized composition consisting essentially of molten dimethyl terephthalate and from about 0.1 to 1% by weight of methanol.

References Cited

FOREIGN PATENTS 873,913   8/1961   Great Britain.

LORRAINE A. WEINBERGER, Primary Examiner

E. J. SKELLY, Assistant Examiner